US008885553B2

(12) United States Patent
Sarma

(10) Patent No.: US 8,885,553 B2
(45) Date of Patent: Nov. 11, 2014

(54) PACKET ROUTING METHOD, PROXY SERVER AND APPARATUS

(75) Inventor: Venkitaraman Sarma, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 12/753,549

(22) Filed: Apr. 2, 2010

(65) Prior Publication Data

US 2011/0243065 A1  Oct. 6, 2011

(51) Int. Cl.
*H04L 12/66* (2006.01)
*H04W 40/02* (2009.01)
*H04W 8/26* (2009.01)
*H04W 80/04* (2009.01)
*H04W 80/10* (2009.01)

(52) U.S. Cl.
CPC .............. *H04W 40/02* (2013.01); *H04W 8/26* (2013.01); *H04W 80/04* (2013.01); *H04W 80/10* (2013.01)
USPC ...................................................... 370/328

(58) Field of Classification Search
None
See application file for complete search history.

(56) References Cited

U.S. PATENT DOCUMENTS

| 6,839,331 | B2 * | 1/2005 | Rudnick .................... 370/312 |
| 6,886,103 | B1 * | 4/2005 | Brustoloni et al. .......... 726/15 |
| 7,480,710 | B1 | 1/2009 | Olson et al. |
| 2004/0024901 | A1 | 2/2004 | Agrawal et al. |
| 2006/0176884 | A1 | 8/2006 | Fair et al. |
| 2008/0080510 | A1 * | 4/2008 | Zancan .................... 370/392 |
| 2010/0097992 | A1 * | 4/2010 | Velev et al. .............. 370/328 |

OTHER PUBLICATIONS

European Extended Search Report~Nov. 5, 2010~Application No. 10159857.1-2413, 6 pages.
J. Rosenberg et al, SIP: Session Initiation Protocol, The Internet Society (2002), Jun. 2002, 279 pages.
C. Perkins, IP Mobility Support, IBM, Oct. 1996, 82 pages.
D. Johnson et al, Mobility Support in IPv6, The Internet Society (2004), Jun. 2004, 96 pages.
E. Wedlund et al, Mobility Support Using SIP, International conference on Wireless and Mobile multimedia, Seattle WA, 1999, 7 pages.
A. Dutta et al, Application Layer Mobility Management Scheme for Wireless Internet, In Proc of IEEE . . . (3G Wireless '01) San Francisco, CA, May 2001, 7 pages.
D. Vali et al, An Efficient Micro-Mobility Solution for SIP Networks, Globecom 2003, 5 pages.

(Continued)

*Primary Examiner* — Faruk Hamza
*Assistant Examiner* — Alan Lindenbaum

(57) ABSTRACT

A method is described of routing a packet comprising routing information between a mobile host and a correspondent host in respective first and further network domains, at least the first network domain comprising a plurality of subnets, said mobile host being attached to one of said subnets. The method comprises registering the mobile host with the first network domain, said registration including assigning a global IP address and a local IP address to said mobile host, said local IP address being associated with the subnet to which the mobile host is attached; communicating said local IP address to said mobile host; using the global IP address as the routing information between the domains; reformatting said packet by replacing the global IP address with the local IP address upon receipt of the packet in the first network domain; and communicating the reformatted request to the mobile host via the associated subnet. A proxy server and apparatus for use in this method are also disclosed.

12 Claims, 4 Drawing Sheets

(56) References Cited

OTHER PUBLICATIONS

Figure 1:
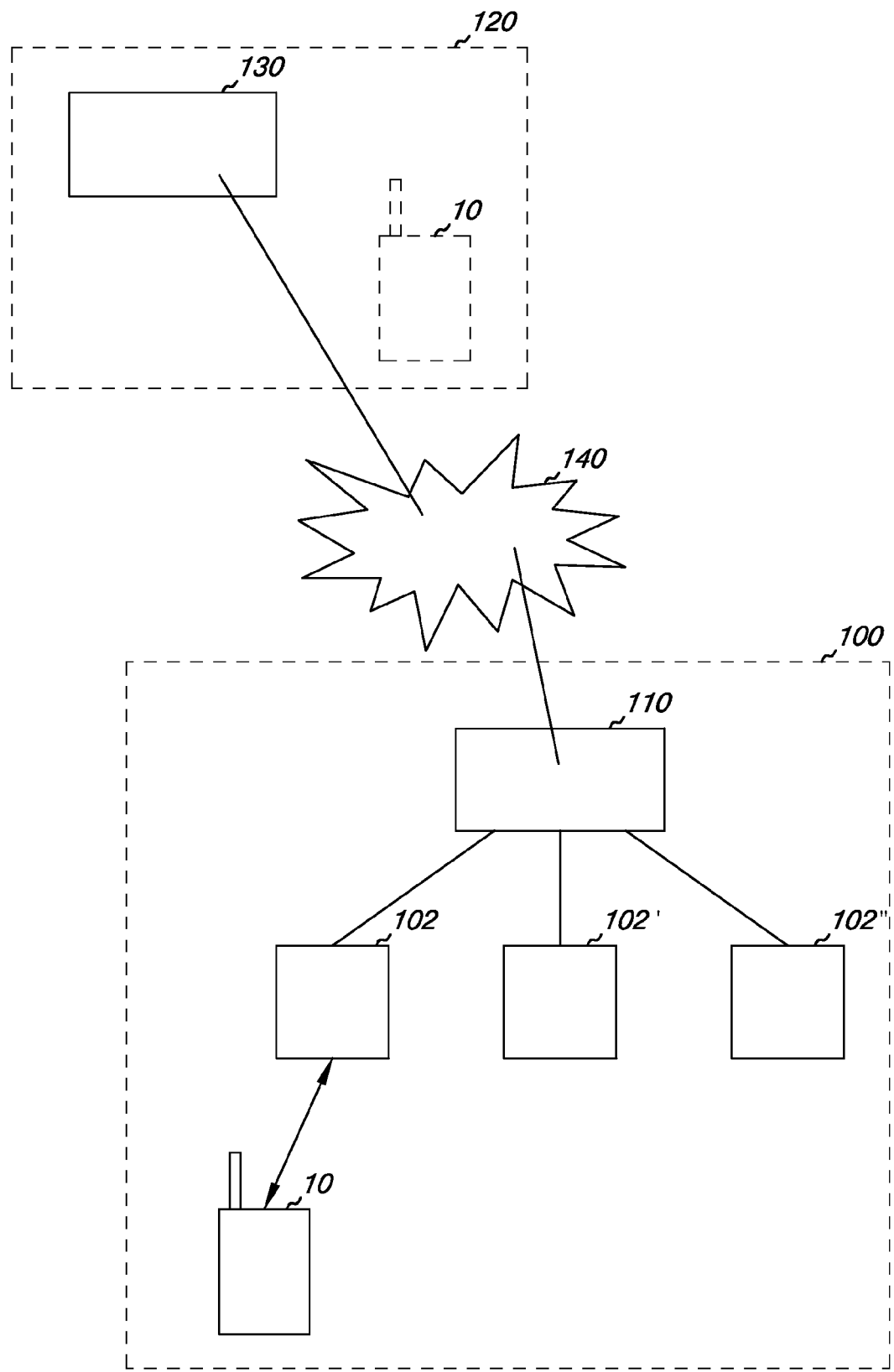

C. Castelluccia, HMIPv6: A Hierarchical Mobile IPv6 Proposal, ACM Mobile Computing and Communication Review (MC2R), vol. 4, No. 1, Apr. 2000, 12 pages.

R. Ramjee et al, IP Micro-Mobility Support Using HAWAII, Internet draft, Jun. 1999, 30 pages.

A. Misra et al, IDMP: An Intra Domain Mobility Management Protocol Using Mobility Agents, Internet Draft, Jan. 2000, 59 pages.

C. Yeh et al, SIP Terminal Mobility for Both IPv4 and IPv6. Jul. 4-7, 2006.

H. Schulzrinne et al, Application-Layer Mobility USing SIP, Mobile Computing and Communications Review, vol. 4, No. 3. Jul. 2000.

\* cited by examiner

PACKET ROUTING METHOD, PROXY SERVER AND APPARATUS

The present invention relates to a method of routing a packet comprising routing information between a mobile host and a correspondent host in respective first and further network domains, at least the first network domain comprising a plurality of subnets, said mobile host being attached to one of the said subnets.

The present invention further relates to a proxy server for a network domain comprising a plurality of subnets, said proxy server comprising of a registrar for registering a local IP address and a global IP address assigned to a mobile host associated with one of said subnets upon registration of said host with the network domain.

The present invention yet further relates to an apparatus for sending a packet including a source address over a network to a further apparatus.

BACKGROUND OF THE INVENTION

The growing influence of the Internet on human communications has increased the demand for the availability of Internet-based services. This for instance has led to mobile, networks offering Internet services to allow the users of the network internet access. However, offering Internet access on a mobile network is not without technical complications. The Internet protocol (IP) was designed for use with fixed hosts and does not consider support for user mobility.

Efforts have been made to provide mobile, e.g. wireless, networks that support communication using IP. Such networks are typically referred to as mobile IP networks. Early efforts to support mobility on such networks include solutions that handle host mobility at the network layer, such as Mobile IP, Mobile IPv4 and Mobile IPv6. More recently, solutions for supporting host mobility at the application layer have been proposed. Of these solutions, the Session Initiation Protocol (SIP) appears to be the most promising implementation of such a solution.

The SIP is a simple text-based application-layer protocol that is gaining wide acceptance as the call control protocol for multimedia services in IP networks. The 3rd generation partnership project (3GPP) has already adopted SIP for multimedia call control in next generation networks. SIP can intrinsically handle user mobility, since it uses logical addresses, i.e. SIP Uniform Resource Identifiers (SIP-URI) for identifying SIP users, independent of the device they are currently using.

SIP-based communication protocols may be extended to also cover terminal mobility including service coverage inroaming network domains. This is referred to as Mobile SIP. According to this approach ongoing SIP sessions need to be re-established after handoff to a new subnet router. End-to-end SIP session re-establishment messages are exchanged, containing the flew IP address of the mobile host and updated session description for the ongoing session. This enables the correspondent host to send all subsequent data to the new IP address of the mobile host. This may be unacceptable if the session has to comply with Quality of Service (QoS) requirements.

The roaming network domain may comprise of a plurality of subnets. Mobile SIP is not suitable for intra-domain handoffs because it involves end-to-end signaling exchange for IP address update after handoff to a new subnet router within the domain. An alternative to Mobile SIP will be to assign two IP addresses to the mobile host—a local IP address that has validity within the domain that the host is currently roaming and a global IP address that has validity outside the domain. The global IP address will be registered with the home network of the terminal. In this case, the domain router of the roaming network domain can tunnel the packet comprising the global IP address in its header to the subnet associated with the terminal. Such tunneling typically includes wrapping the packet with a wrapper including a header specifying the local IP address such that the registration details stored on the home network of the mobile terminal do not need to be updated every time the mobile terminal switches between subnets in the roaming network domain. The mobile terminal also tunnels outgoing packets using such a wrapper. A drawback of this approach is that it creates additional overhead in terms of packet size. This can be particularly undesirable when the packets themselves are small. For instance, in the IPv4 standard; a minimum of an additional 20 octets will be added to all the packets because of tunneling.

BRIEF DESCRIPTION OF THE EMBODIMENTS

Figure 2:
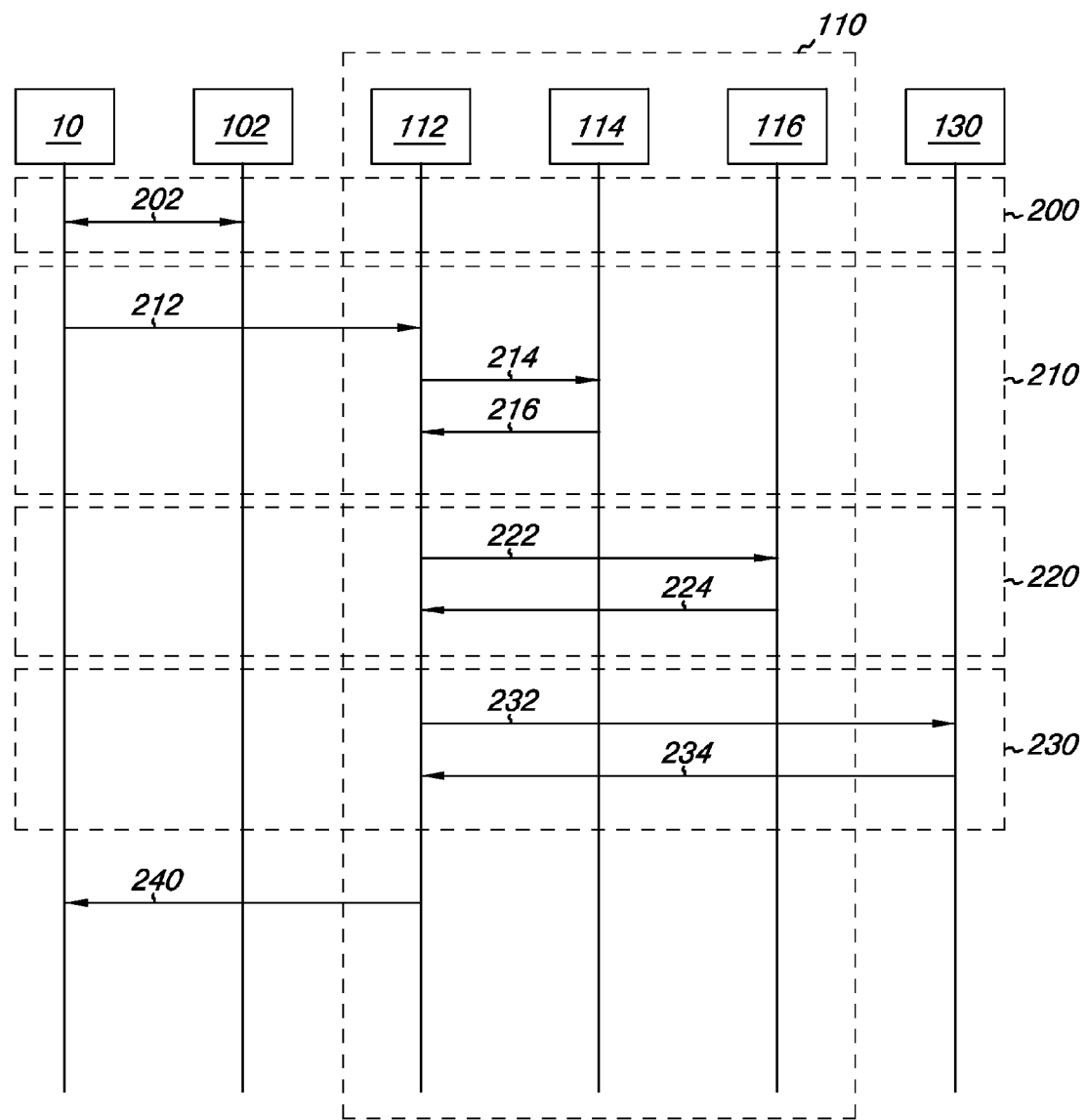
Figure 3:
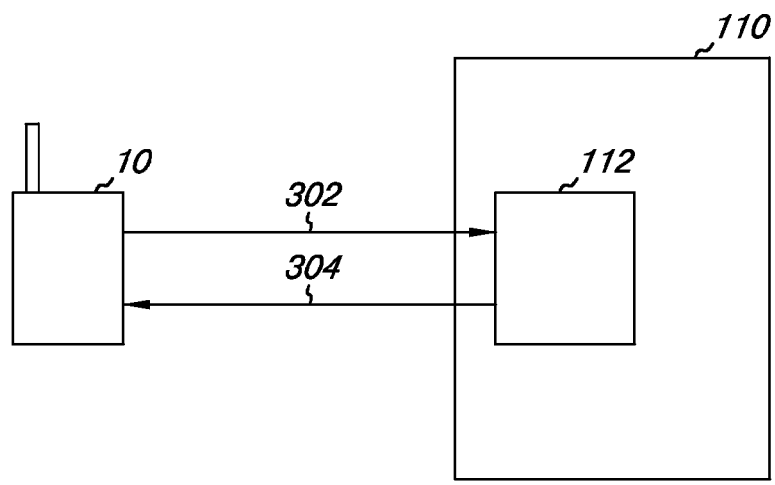
Figure 4:
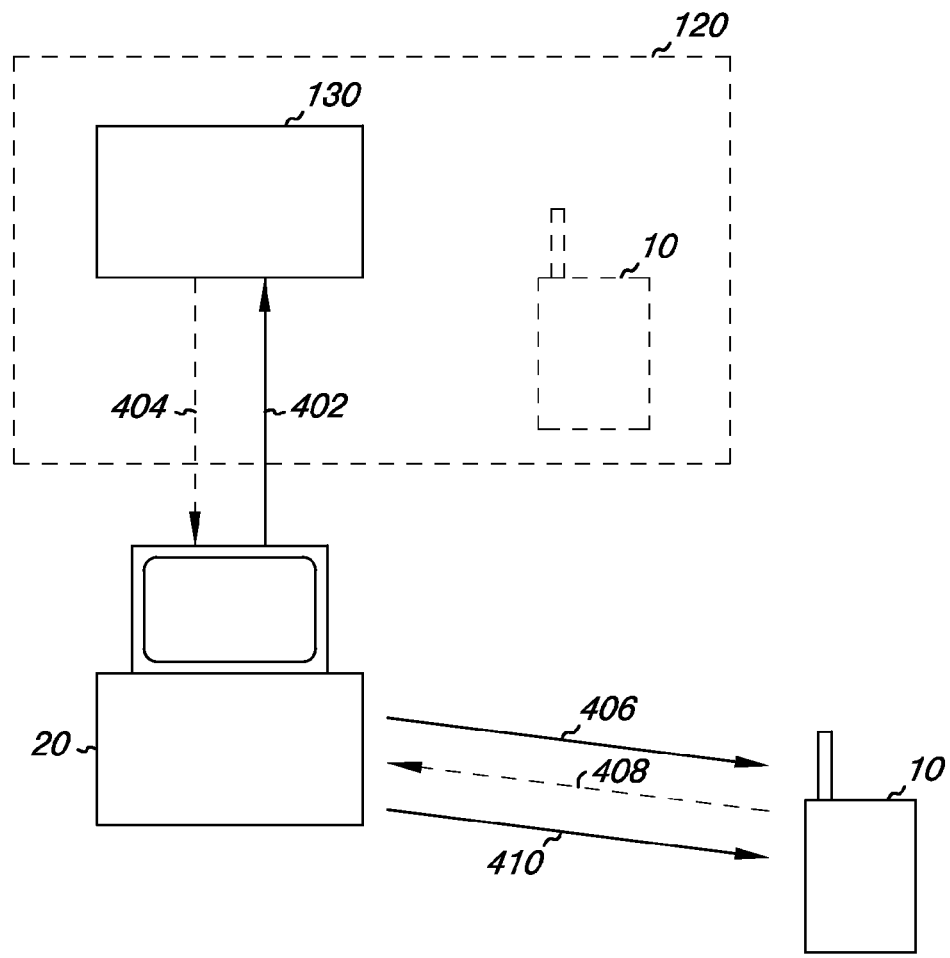
Figure 5:
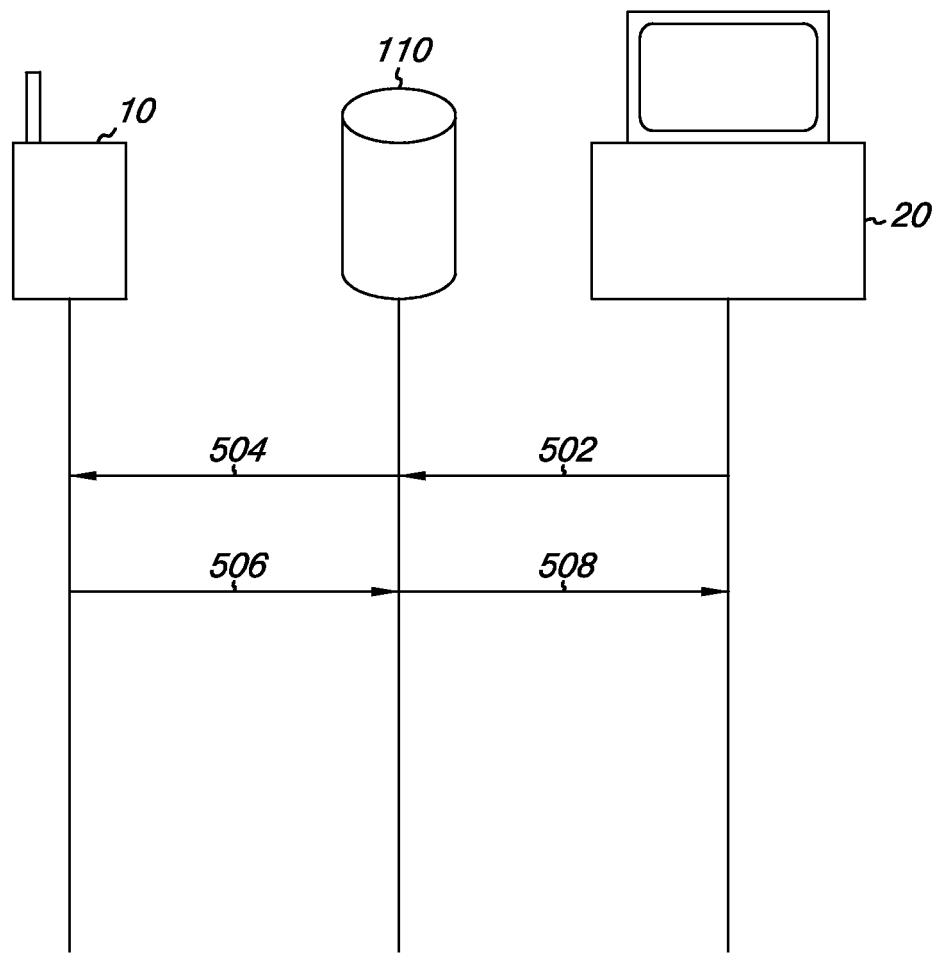

Embodiments of the invention are described in more detail and by way of non-limiting examples with reference to the accompanying drawings, wherein FIG. 1 schematically depicts a roaming network scenario contemplated by an embodiment of the present invention;

FIG. 2 schematically depicts a registry procedure of a mobile host in the scenario of FIG. 1;

FIG. 3 schematically depicts an intra-domain handoff procedure for the mobile host;

FIG. 4 schematically depicts the communications involved with the initiation of a SIP session in accordance with an embodiment of the present invention; and FIG. 5 schematically depicts the communications during the SIP session in accordance with an embodiment of the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

FIG. 1 depicts a typical scenario in which a mobile host 10 which is registered with the domain server 130 in network domain 120 visits a roaming network domain 100 which may be a wireless network domain such as for instance a wireless LAN. In this embodiment, the mobile host 10 utilizes SIP subscription method to acquire access to multimedia services, i.e. to set up a multimedia session with another host, which may be located in another network domain. As previously explained, the advantage of SIP session initialization method is that the endpoints of a SIP session are defined by so-called SIP-URIs. In SIP terminology, the mobile host 10 is a user agent capable of initiating and terminating SIP sessions. The domain server 130 typically fulfils the role of proxy server and registrar for the mobile host 10, which means that this server contains the mapping of the SIP-URI to a global IP address. In the context of the present application, a global IP address is an address that is used for IP communication between different domains in the internet (140 in FIG. 1). In contrast, a local IP address is an address that is typically used for communication inside a network domain.

The roaming network domain 100 may comprise of a plurality of subnets identified by subnet routers 102, 102' and 102". Upon introducing the mobile host 10 to the roaming network domain 100, for instance by powering up the mobile host 10, the mobile host 10' is registered with the roaming network domain 100 in accordance with an embodiment that is explained in more detail with the aid of FIG. 2. Upon introduction of the mobile host 10 in the roaming network domain 100, the mobile host 10 is assigned a local IP address by one of the subnet routers of the roaming network domain 100 with which the mobile host 10 has become associated upon introduction in this network domain. In FIG. 1, this is subnet router 102. The assignment of the local IP address to the mobile host 10, which may be selected from a pool of local IP addresses available to the associated subnet router, is indicated by communication 202 in FIG. 2. This completes the local address allocation part 200 of the registration procedure. This now enables the mobile host 10 to initiate an SIP register request with the domain server 110.

The domain server 110 typically comprises of a SIP proxy server 112, a SIP local registrar 114 and a domain router 116. Such a server is sometimes also referred to as a mobility agent, which is a domain border entity responsible for locally handling intra-domain mobility, thereby enabling fast intra-domain handoffs. The SIP register request 212 is directed to the SIP proxy server 112 which accesses the server database (not shown) to determine if the SIP-URI is already registered with the roaming network domain 100. In case such a registration does not yet exist, the proxy server 112 forwards the SIP registration request to the SIP local registrar 114 in communication 214 after which the SIP local registrar 114 maps the assigned local IP address to the SIP-URI, and signals the SIP proxy server 112 in communication 216 that this mapping has been completed. This completes the regional registration process 210.

Subsequently, the SIP proxy server 112 requests the domain router 116 by means of communication 222 to allocate a global IP address to the mobile host 10. This is typically done once, i.e. when the mobile host 10 enters the roaming network domain 100. The domain router 116 selects a global IP address from a pool of IP addresses available to the domain router 116 and maps the assigned global IP address to the SIP-URI in the server database, after which the domain router 116 signals the SIP proxy server 112 by means of communication 224 that the assignment of the global IP address to the mobile host 10 has been completed. This completes the global address allocation procedure 220.

The SIP proxy server 112 now establishes a communication 232 with the SIP home registrar 130, in which the SIP home registrar 130 is informed of the global IP address that has been assigned to the mobile host 10 to allow the SIP home registrar 132 to redirect SIP requests for the mobile host 10 to the roaming network domain 100. The address of the SIP home registrar 132 is typically comprised in the SIP-URI. Hence, the SIP proxy server 112 can obtain the address of the SIP home registrar 132 by evaluation of the SIP-URI. It will be appreciated that this is also typically done once; i.e. during the registration of the mobile host 10 in the roaming network domain 100.

Upon completion of the registration of this assigned global IP address, the SIP home registrar 130 informs the SIP proxy server 112 in communication 234 that the registration has been completed. This completes the home registration procedure 230. The SIP proxy server 112 subsequently signals the mobile host 10 in communication 240 that the registration procedure of the mobile host 10 with the roaming network domain 100 has been completed.

At this point, it is important to observe that at no stage during this registration procedure the mobile host 10 is being provided with the global IP address that is assigned to the mobile host 10 by the domain router 116. The mobile host 10 only has awareness of the assigned local IP address; which has been communicated in communication 202. This has implications for subsequent SIP sessions as will be discussed in greater detail below.

The domain server 110 maintains a mapping between the SIP-URI, the local IP address and the global IP address. This mapping will be refreshed when the mobile host 10 moves to a new subnet within the domain or if the mobile host 10 goes down for a period of time exceeding a defined period threshold. Refreshing such a mapping typically encompasses repeating the local address allocation procedure 200 and the regional registration procedure 210. In the regional registration procedure 210, the domain server 110 or more precisely the SIP proxy server 112 will detect that the SIP-URI is already assigned a global IP address such that the registration completion communication 240 can be generated upon completion of the regional registration procedure 210.

In an embodiment, the application layer of the mobile host polls the network layer at regular intervals (this interval will be of the order of a few seconds) to see if IP address of the mobile host has changed. An alternative implementation could be that the SIP application should subscribe to be notified of IP address change at the network layer. This IP address change will trigger the SIP signaling message exchange required for regional registration and possibly home registration (home registration will be required if the mobile host has moved to a subnet in a new domain)

FIG. 3 schematically depicts the regional registration procedure for a mobile host 10 that is already assigned a global IP address for the roaming network domain 100. Upon reception of the local IP address from the subnet router to which the mobile host 10 has migrated, the mobile host 10 issues a new SIP register request 302 to the SIP proxy server 112 of the domain server 110, which completes the regional registration by replacing the previously assigned local IP address with the newly assigned local IP address in the mapping table comprising the mapping between the SIP-URI, the local IP address and the global IP address and subsequently issues a registration completion acknowledgement 304.

In case of an inter-domain handoff of the mobile host 10, i.e. migration from one domain to another, the registration process as depicted in FIG. 2 may be repeated within the newly visited roaming network domain.

Upon completion of the registration process, the mobile host 10 is ready to initiate or accept new SIP sessions. The principle of such a session is demonstrated in FIG. 4. A correspondent host 20 is shown to attempt the initiation of a SIP session with the mobile host 10. A SIP invite 402 is forwarded to the home registrar 130 of the mobile host 10. In communication 404, the home registrar 130, acting as a redirect server, provides the correspondent host 20 with the global IP address assigned to the mobile host 10. The correspondent host 20 generates a redirected SIP invite 406 to the mobile host 10 in the roaming network domain 100. The mobile host 10 can accept the SIP invite by directing ah acceptance message 408 to the correspondent host 20, after which data may be communicated between the mobile host 10 and a correspondent host 20 in the SIP session 410.

It will be appreciated that the packets communicated between the correspondent host 20 and the mobile host 10 comprise routing information to ensure that the network 140 routes packets to the appropriate destination. This routing information typically includes the global IP address of the destination of the packets. In the art, the packets are typically tunneled between the domain router 116 and the mobile host 10 by encapsulating the packets in a wrapper that includes the local IP address at which the mobile host 10 can be reached. Similarly, the mobile host 10 will tunnel any outgoing packet by encapsulating the packet in a wrapper that includes the local IP address. The domain router 116 will remove the wrapper from the packet before forwarding the packet to the correspondent host 20. As previously explained, this procedure increases the packet size in intra-domain communications.

In the embodiment, which is schematically depicted in FIG. 5, intra-domain tunneling is avoided altogether. The correspondent host 20 is arranged to forward a packet 502 to the domain server 110. The packet 502 contains routing information including the global IP address that has been assigned to the mobile host 10 inside the roaming network domain 100. Upon receipt of the packet 502 by the domain server 110, the domain server 110 accesses its database to retrieve the corresponding local IP address of the mobile host 10. The domain server 110 subsequently reconstructs the packet 502 by replacing the global IP address with the local IP address, thus yielding a reconstructed packet 504. This reconstruction will necessitate the recalculation of IP header checksum.

Similarly, the mobile host 10 can generate a packet 506 for transmission to the correspondent host 20 in which the routing information including the source address of the packet 506 is the local IP address that has been assigned to mobile host 10 by one of the subnet routers 102. Again, the domain server 110 upon reception of the packet 506 will reconstruct this packet by replacing the local IP address in the source information of the packet with the global IP address of the mobile host 10, which may be retrieved from the mapping between these addresses as stored in the database of the domain server 110, thus yielding a reconstructed packet 508. In an embodiment, the reconstruction of the packet 506 also includes the recalculation of the IP header checksum.

The aforementioned packet reconstruction approach can be seen as a new application of network address translation. In an embodiment, the domain server 10 is adapted to perform such a network address translation. Since it is known per se how to implement network address translation on a server, this embodiment is not further explained for reasons of brevity only. It is however pointed out that network address translation applied for the purpose of the reconstruction of a SIP packet has not been previously reported.

It should further be appreciated that the mobile host 10, i.e. an apparatus, for instance a mobile communication device such as a mobile phone, a personal digital assistant, a laptop, a notebook and so on, also requires adaptation since the known host devices are all adapted to tunnel intra-domain packets as previously explained. In an embodiment, the mobile host 10 is adapted to insert its local IP address rather than its global IP address as the source address in an outgoing packet. This adaptation of the mobile host 10 may be implemented in any suitable way. It should be appreciated that this adaptation does not require a modification of the protocol stack of the mobile host 10. This embodiment merely eliminates the need for wrapping each outgoing packet with an additional IP header thus simplifying the processing at the protocol stack of the mobile host 10.

The aforementioned packet reconstruction technique may be advantageously applied in wireless LAN. For instance, the aforementioned packet reconstruction technique could be advantageously adopted in 3GPP standards such as the ETSI TN 23.234 standard, because it would obviate the need for intra-domain packet tunneling, thus reducing the size of intra-domain packet communications and improving packet communications rates as a consequence. Alternatively or in addition, the aforementioned packet reconstruction technique could be adopted in accordance with an Institute of Electrical and Electronics Engineers (IEEE) 802.11 standard.

It is further pointed out that the aforementioned packet construction technique can also be used in combination with mid-session intra-domain handoffs. During such a handoff, the domain server 110 would buffer incoming packets 502 until the new local IP address of the mobile host 10 has been registered with the domain server 110, after which the reconstructed packets 504 are forwarded to the new Ideal IP address of the mobile host 10.

It should be appreciated, that although embodiments of the present invention have been described in the context of SIP packet communications, the present invention is hot limited to this specific communication technique. Various embodiments of the present invention may be applied to any suitable communication technique in which packets comprising global IP address-based routing information are communicated between hosts in respective network domains.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware; The mere fact that certain measures are recited in mutually different dependent claims does not indicate that a combination of these measures cannot be used to advantage.

The invention claimed is:

1. A method of routing a session initiation protocol (SIP) packet, wherein the SIP packet comprises routing information between a mobile host and a correspondent host in respective first and further network domains, at least the first network domain comprising a plurality of subnets, said mobile host being attached to one of said subnets, the method comprising:

using a mapping between a SIP-Uniform Resource Identifier (URI), a local IP address and a global IP address to identify the mobile host inside the first network domain;

receiving a new local IP address of the mobile host upon the mobile host attaching to another one of said subnets, wherein the global IP address has validity outside the first network domain and wherein the new local IP address has validity inside the another one of said subnets, said routing information comprising the global IP address;

refreshing the mapping by replacing the local IP address with the new local IP address in the mapping;

reformatting said SIP packet by replacing the global IP address in a single IP header of the SIP packet with the new local IP address in the single IP header of the SIP packet upon receipt of the SIP packet in the first network domain; and communicating the reformatted SIP packet to the mobile host via the subnet to which the mobile host is attached.

2. The method of claim 1, wherein at least the first network domain is a wireless network domain comprising a plurality of wireless subnets.

3. The method of claim 2, wherein the wireless network domain is a wireless local area network domain.

4. The method of claim 1, wherein the routing information comprises a checksum, said reformatting step comprising recalculating the checksum for the new local IP address.

5. The method of claim 1, further comprising of:
transmitting a further SIP packet comprising of a source address from the mobile host to the correspondent host following establishment of a session between the mobile, host and the correspondent host, said source address comprising the received new local IP address; and reformatting said SIP packet by replacing the new local IP address in the single IP header of the SIP packet with the global IP address of the mobile host in the single IP header of the SIP packet prior to communicating said SIP packet between the respective domains.

6. A proxy server for a network domain comprising a plurality of subnets, said proxy server comprising a registrar to register a local IP address associated with one of said subnets, identify a mobile host inside the one of said subnets using a mapping between a SIP-Uniform Resource Identifier (URI), the local IP address and a global IP address, receive a new local IP address of the mobile host upon the mobile host attaching to another one of said subnets, refresh the mapping by replacing the local IP address with the new local IP address in the mapping, receive the global IP address assigned to a mobile host associated with one of said subnets upon registration of said mobile host with the network domain, said mobile host to receive session initiated protocol (SIP) packets from a correspondent host in a further network domain, said SIP packets including only a single IP header comprising the global IP address, wherein the proxy server replaces the global IP address in the single IP header of said SIP packets with the new local IP address in the single IP header prior to forwarding the SIP packet to the subnet to which said mobile host is attached.

7. The proxy server of claim 6, wherein the single IP header comprises a checksum, the proxy server further to recalculate the checksum after replacement of the global IP address in the single IP header of said SIP packets with the new local IP address in the IP header of said SIP packets.

8. The proxy server of claim 6, wherein the mobile host further sends a SIP packet including the new local IP address in an IP header of the SIP packet as a source address to the correspondent host, the proxy server further to replace the source address in the further SIP packet with the global IP address in the IP header of the SIP packet prior to forwarding the further SIP packet to the further network domain.

9. The proxy server of claim 6, wherein the network domain comprises a wireless network.

10. An apparatus to send a session initiated protocol (SIP) packet including a source address over a network to a further apparatus, said network comprising a first network domain comprising a plurality of subnets, wherein the apparatus stores a local IP address assigned to the apparatus by a router of one of said subnets of the first network domain to which the apparatus is attached, receives a new local IP address of the further apparatus upon the further apparatus attaching to another one of said subnets, maintains a mapping between a SIP-Uniform Resource Identifier (URI) and the local IP address, and refreshes the mapping, upon the further apparatus attaching to another one of said subnets, by replacing the local IP address with the new local IP address in the mapping between the SIP-URI and the local IP address, said new local IP address having validity inside the another one of said subnets, and to insert the new local IP address as the source address in a single IP header of said SIP packet.

11. The apparatus of claim 10, wherein the apparatus wirelessly with a subnet to which the apparatus is attached.

12. The apparatus of claim 11, wherein the apparatus communicates in accordance with the IEEE 802.11 standard.

* * * * *